Nov. 28, 1933.   H. M. SPENCER   1,936,887
CELLULAR COMPOSITION AND METHOD OF MAKING THE SAME
Filed June 13, 1931
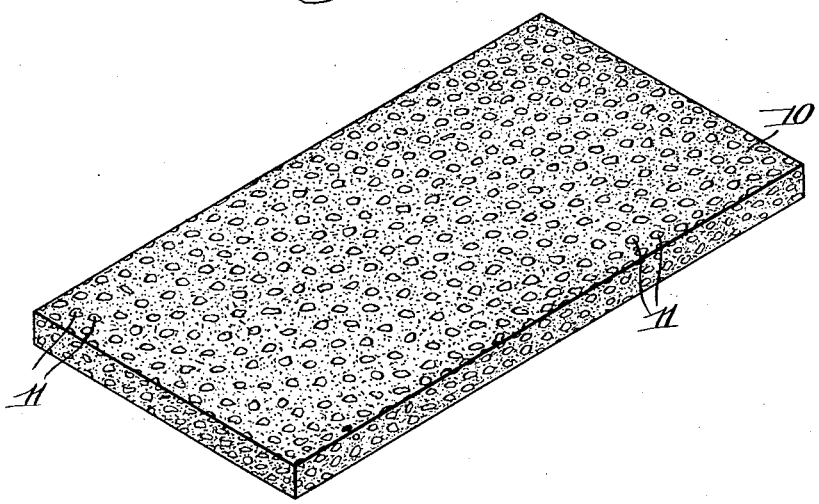
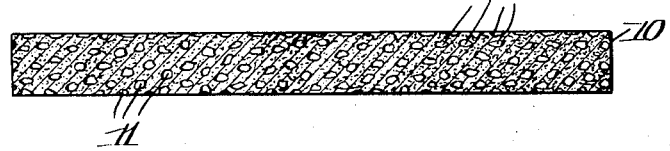
INVENTOR
Hugh M. Spencer
BY Edward H. Cumpston
his ATTORNEY Patented Nov. 28, 1933

1,936,887

UNITED STATES PATENT OFFICE 1,936,887

CELLULAR COMPOSITION AND METHOD OF MAKING THE SAME

Hugh M. Spencer, Lockport, N. Y., assignor to The Upson Company, Lockport, N. Y., a corporation of New York Application June 13, 1931. Serial No. 544,166

7 Claims. (Cl. 106—18)

The present invention relates to an intumescent composition, and has for its object the provision of a relatively inexpensive, light, serviceable, and satisfactory composition capable of a variety of uses. Another object of the invention is the provision of a simple and satisfactory method for making a composition of this character.

To these and other ends the invention resides in certain improvements and combinations of parts, all as will be hereinafter more fully described, the novel features being pointed out in the claims at the end of the specification.

In the drawing:

Fig. 1 is a perspective view of a panel of composition made in accordance with the present invention, and Fig. 2 is a cross section therethrough.

Similar reference numerals throughout the several views indicate the same parts.

This application is partly a continuation of my application, Serial No. 352,852, filed April 5, 1929, for Molded compositions, which has now become Patent No. 1,821,120, granted September 1, 1931. The present application is filed as a result of a requirement for division by the Patent Office in the application which has resulted in the above mentioned patent.

In the production of wood pulp by the sulphite process, there is produced as a by-product, a so-called sulphite liquor, which is obtained through the cooking of the wood with an aqueous solution of the acid sulphites of lime and/or magnesium, for example. This sulphite liquor is available in great quantities at relatively low cost, because of the fact that it is a by-product of the wood pulp industries and is usually wasted. A commercial use for this sulphite liquor has long been sought.

The sulphite liquor, originally of an acid character, may be rendered neutral or nearly neutral by suitable reagents and may be concentrated by evaporation, such concentration being preferably, though not necessarily, carried to the point where a sufficient amount of water has been expelled to produce a substantially dry powder. This powder, resulting from the concentration of the sulphite liquor, may be conveniently termed sulphite liquor pitch.

According to the present invention, suitable quantities of dissolved sulphite liquor pitch or of sulphite liquor concentrated to a suitable point short of dryness, are added to a finely divided inorganic filler, such for example, as ground limestone. The mixture of filler and sulphite liquor is then heated, and under the action of heat the mixture will intumesce or swell into a hard cellular body having numerous small pores or openings therein, somewhat similar to the cells of a loaf of bread.

As an example of proportions which have been found to be satisfactory, ten pounds of the dry sulphite liquor pitch may be dissolved in five pounds of hot water, and the resulting fifteen pounds of sulphite liquor solution may be mixed with sixty pounds of limestone ground to a fineness so that over ninety-five percent thereof passes through a two hundred mesh screen. The mixture is then placed in a suitable mold or form in which it may be heated so as to cause intumescence. Satisfactory results are obtained by heating to a temperature of about 340° to 360° F., for example, which heating may conveniently and satisfactorily be accomplished by placing the material between steam heated platens or in a steam heated mold. The mixture must not be heated too rapidly or the intumescence will be so violent that the mixture will be blown out of the mold. On the other hand, if heated too slowly, it will simply dry out slowly without intumescing to form a cellular product.

Heating should be continued until all or practically all of the moisture is driven from the product. Ordinarily, heating for about ten or fifteen minutes at the above temperature produces satisfactory results, when the product is of approximately the proportions above stated and is in the form of a panel about ⅜ inch thick. When the material is in the form of thicker panels, the time of heating may be somewhat increased, and when the proportions of the ingredients or the temperature to which the material is heated are varied, the time of heating may likewise be more or less than that above stated, as determined by the judgment and skill of the person controlling the process.

The above example of proportions is not to be taken in a limiting sense, but is given merely as an example of conditions which will produce satisfactory results. It is possible to use limestone which is ground either coarser or finer than that above specified, and other material, such as ground or pulverized sandstone, shale, slag, or various other inorganic materials may be used as fillers. In general, the finer the filler is ground, the greater is the quantity of sulphite liquor solution which is needed, and the coarser the filler material, the less the quantity of sulphite liquor solution. The use of too coarse a filler is not advantageous, however, because the porosity of the product is less uniform than if a finer material is used.

The strength or concentration of the sulphite liquor solution may also be varied, as desired, although the portions above specified give satisfactory results in general. If the solution of sulphite liquor is too thin, the pores formed in the product during the intumescing operation are too coarse, and the walls surrounding the pores are not sufficiently stiff to prevent collapse of the pores before the walls harden. Furthermore, if too thin a solution is used, the boiling of the water in the solution during heating is so violent that there is a tendency to force the filling out of the mold. On the other hand, if too concentrated a solution of sulphite liquor is used, the intumescing is not adequate, the pores are too small and too few, the entire product is crumbly and unsuitable, and the cost thereof is increased because of the cost of the additional sulphite liquor employed.

It is difficult to set absolute limits for the proportions and concentration of the materials, since the exact character of the final product desired may be varied. The exact proportions to be used under any given circumstances are practical matters rather than theoretical, and the general principles involved have been sufficiently set forth above so that those skilled in the art can produce satisfactory results by following these principles and by using their skill and judgment.

During the heating and intumescing of the product it is preferably confined in a mold or otherwise to give it the desired shape or form, and to prevent unlimited expansion. If not confined when intumesced, the pores will become so large that the material becomes light and frothy, and is practically useless as a construction material. The degree of density of the final product and size of the pores therein can thus be controlled to some extent by varying the ratio of mixture introduced into the mold relative to the cubic capacity of the mold. Obviously if the mold is nearly filled with material before intumescing takes place, the mixture can expand only to a relatively slight extent, so that the pores will be smaller and the material will be relatively dense. On the other hand, if a less quantity of material is introduced into the mold, when it intumesces it can expand to a greater degree to fill the mold, so that the pores will be larger and the material will be less dense.

The molds in which the material is intumesced may be of any suitable form, such as molds lined with paper or cardboard, molds of metal, or the like. Preferably metal molds are greased to prevent the product from sticking to the walls of the mold.

One form of mold which is especially satisfactory in the production of flat slabs or sheets of material comprises a pair of heated platens spaced from each other by a distance equal to the intended thickness of the final product. The mixture of filler and sulphite liquor may be introduced between the platens at one end or edge and moved continuously therethrough toward the opposite end or edges, emerging as a finished intumesced slab or sheet, which may be further heat treated to harden it if desired, in case it is not sufficiently hard when it emerges from the platens after the intumescing operation is finished. When using a mold of this form, slabs or sheets of material of the desired thickness can be produced substantially continuously, the mixture being fed substantially continuously to one end or edge of the platens and the intumesced product being withdrawn substantially continuously from the other end or edge.

To prevent the product from sticking to the platens and to assist in pulling it through the platens, liners are preferably used on opposite sides of the product and preferably move through the platens with the product. These liners may be in the form of paper or cardboard which may remain permanently attached to the opposite faces of the product, or they may be of any suitable sheet material, including paper or cardboard, subsequently stripped or removed from the product. For example, if the liners are to be stripped they may be of waxed or greased paper which will not stick tenaciously to the product, or of greased sheets of metal which will move through the platens with the product, but which may be subsequently stripped therefrom.

A slab made as above described is shown in perspective in Fig. 1, and in cross section in Fig. 2, in which the main body of the material is designated by the numeral 10, and some of the pores are indicated by the numeral 11.

An intumescent composition employing sulphite liquor according to the present invention, has advantages over intumescent compositions in which sodium silicate is used, in that the sulphite liquor composition is in general somewhat lighter than the sodium silicate composition for a given thickness and strength, and the sulphite liquor is of materially lower cost than the sodium silicate necessary to produce the same quantity of product.

I claim:

1. The method of making a cellular composition which comprises forming a mixture of relatively finely divided inorganic material and sulphite liquor solution, and heating said mixture to cause it to intumesce to form a cellular product.

2. The method of making a cellular composition which comprises evaporating sulphite liquor substantially to dryness to form sulphite liquor pitch, adding water to such pitch to form a sulphite liquor solution, forming a mixture of such sulphite liquor solution and relatively finely divided inorganic material, and heating said mixture to cause it to intumesce to form a cellular product.

3. The method of making a cellular composition which comprises forming a mixture of relatively finely divided inorganic material and sulphite liquor solution, and heating said mixture to approximately 350° F. to cause it to intumesce to form a hard cellular product.

4. As a new article of manufacture, a hard cellular composition comprising a mixture of relatively finely divided inorganic material and a sulphite liquor product.

5. As a new article of manufacture, a hard cellular composition consisting principally of a mixture of relatively finely divided inorganic material and a sulphite liquor product.

6. As a new article of manufacture, a hard cellular composition comprising a mixture of relatively finely divided inorganic material and sulphite liquor pitch.

7. A composition comprising relatively finely divided inorganic material and a sulphite liquor product, said composition being formed into a relatively hard porous mass having a multitude of cells interspersed therein.

HUGH M. SPENCER.